United States Patent [19]

Beck

[11] Patent Number: 5,123,033
[45] Date of Patent: Jun. 16, 1992

[54] EXTRACTION OF AN EXACT SYMBOL RATE AS APPLIED TO BANDWIDTH COMPRESSION OF MODEM SIGNALS THROUGH DEMODULATION AND REMODULATION

[75] Inventor: Eric C. Beck, Colts Neck, N.J.

[73] Assignee: AT&T Bell Laboratories, Murray Hill, N.J.

[21] Appl. No.: 589,297

[22] Filed: Sep. 27, 1990

[51] Int. Cl.⁵ .......................................... H04L 23/00
[52] U.S. Cl. ...................................... 375/121; 375/4; 370/84
[58] Field of Search ........................ 375/3, 4, 3.1, 7, 8, 375/121; 370/84; 371/5.1, 34

[56] References Cited

U.S. PATENT DOCUMENTS

| | | | |
|---|---|---|---|
| 3,534,264 | 10/1970 | Blasbalg et al. | 375/8 |
| 3,993,952 | 11/1976 | Roza | 375/4 |
| 4,761,797 | 8/1988 | Bickers | 375/4 |
| 4,807,257 | 2/1989 | Immink et al. | 375/106 |
| 4,815,137 | 3/1989 | Benvenuto | 381/43 |
| 4,821,286 | 4/1989 | Grackyk et al. | 375/4 |
| 4,887,280 | 12/1989 | Reisenfeld | 375/121 |

*Primary Examiner*—Stephen Chin
*Attorney, Agent, or Firm*—T. Stafford

[57] ABSTRACT

An original symbol rate of a transmitted modem signal which has been demodulated for digital transmission is recovered at a network receiver by obtaining an estimate of error between the original transmitted symbol rate and a known nominal symbol rate. This is realized at the network receiver by measuring an interval between blocks of data in a received signal having other than a known nominal number of data bits. This is achieved because each of the blocks of data is of a known fixed interval. The measured interval is proportional to the desired error estimate. The error estimate is then integrated and employed in an interpolator to adjust the symbol rate of a remodulated modem signal at the network receiver.

14 Claims, 2 Drawing Sheets

EXTRACTION OF AN EXACT SYMBOL RATE AS APPLIED TO BANDWIDTH COMPRESSION OF MODEM SIGNALS THROUGH DEMODULATION AND REMODULATION

TECHNICAL FIELD

This invention relates to digital transmission of voiceband signals and, more particularly, to the transmission of voiceband modem signals.

BACKGROUND OF THE INVENTION

Recently, efficiencies have been realized in the digital transmission of modem signals used in facsimile calls by demodulation and remodulation of the page portion of the facsimile call. This enables the page portion of the facsimile call to be efficiently transmitted over a digital transmission facility. One such arrangement is disclosed in United States patent application of D. O. Anderton and R. L. Daggett Ser. No. 428,560, filed Oct. 30, 1989.

In one such prior demodulation/remodulation arrangement for transmission, the exact timing relationship between a transmission network modem signal demodulator and a transmission network remodulator was not communicated. As a result, facsimile image data was lost because of small differences in the symbol rate of the transmitting facsimile equipment and the transmission network remodulator. In one attempt at overcoming this problem, delays were interjected into the transmission to provide a buffering of the image data. However, the inclusion of such delays did not entirely solve the problem because only facsimile page, i.e., image, data of a limited duration could be transmitted. If the duration of the facsimile page data was longer than the limited duration, some of the page data transmission would be lost. Moreover, the inclusion of such delays in the transmission of digital signals is highly undesirable. Indeed, for continuous data calls, the addition of delay would not mitigate the problem at all.

SUMMARY OF THE INVENTION

The problems of prior modem signal demodulation and remodulation schemes for digital transmission systems are overcome, in accordance with an aspect of the invention, by recovering at a transmission network receiver the original symbol rate of the modem signal which was demodulated for transmission by the network transmitter. More specifically, the original symbol rate of the transmitting modem is recovered at a network transmission receiver, in accordance with the invention, by estimating the error between the original transmitted symbol rate and a known nominal symbol rate. This is achieved by measuring the interval between data blocks in the received demodulated digital signal containing other than a nominal number of data bits. This is possible because each of the data blocks represents a predetermined fixed interval. The estimated error is then employed to adjust the symbol rate of the remodulated signal in the transmission network receiver.

A technical advantage of the invention is that the need for buffering of the digital transmission signal is eliminated and delays in transmission are avoided.

DETAILED DESCRIPTION

Figure 1:
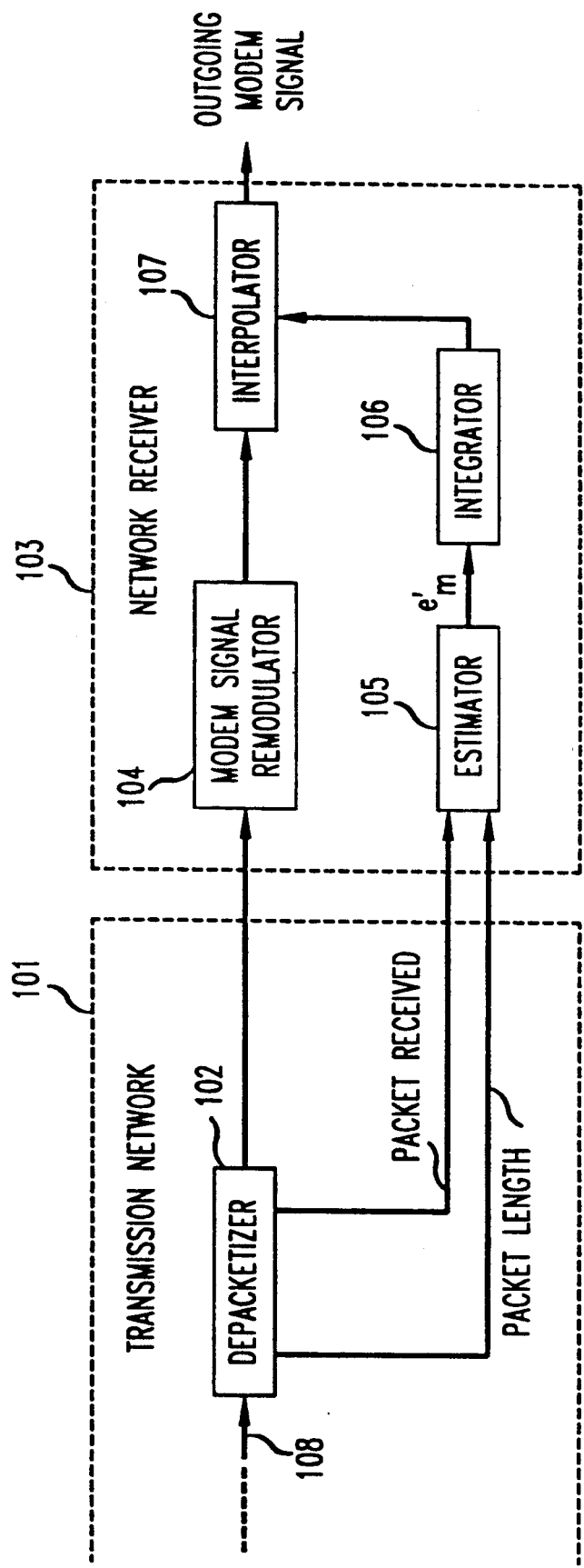
FIG. 1 shows, in simplified block diagram form, details of a portion of a transmission network and a remodulator portion of a network receiver including an embodiment of the invention.

FIG. 1 shows, in simplified block diagram form, a portion of a transmission system employing an embodiment of the invention for recovering the actual symbol rate of an original transmitted modem signal which has been demodulated to obtain a baseband signal for digital transmission. For simplicity and clarity of description, in this embodiment of the invention, it is assumed that the modem signals are in a facsimile call and that the demodulated modem signals are transmitted in packet format. It will be apparent to those skilled in the art that the invention will also be applicable to other modem signal transmission arrangements so long as data blocks of predetermined duration can be detected in order to determine the incoming symbol rate. Accordingly, shown is a portion of transmission network 101 including depacketizer 102. Data signals received on transmission line 108 are depacketized in depacketizer 102 into digital samples which are supplied to network receiver 103 and therein to remodulator 104. In one example, not to be construed as limiting the scope of the invention, the facsimile page information is transmitted in the CCITT Recommendation V0.29 format. Consequently, remodulator 104 yields a V0.29 modem modulated signal in known fashion at the nominal symbol rate of the modem signal. It is important to note that the symbol rate of the remodulated modem signal output from remodulator 104 is a nominal number of symbols for each packet interval. This result is readily realized by employing the same transmission network timing reference for both generating packets in a network transmitter and the symbol rate clock in remodulator 104. Such remodulator arrangements are known (see for example, the United States patent application Ser. No. 428,560, cited above, which application is hereby incorporated by reference).

Depacketizer 102 also supplies a control signal indicating that a packet has been received and an indication of the length of the packet. The packet length indication indicates the number of data bits in the packet. It should also be noted that the information carrying portion of each packet is a predetermined fixed interval. In this example, the fixed interval, not to be construed as limiting the invention, is 20 milliseconds. The packet received indication and the packet length indication are supplied to estimator 105. Such depacketizer arrangements are known. Moreover, it will be apparent to those skilled in the art how to obtain an indication that a packet has been received and how to obtain the length indication from the packet.

Estimator 105 is employed, in accordance with the invention, to generate an estimate of error between the actual transmitted symbol rate and the nominal symbol rate of the remodulated modem signal output from remodulator 104. It is noted that the error estimate $\epsilon'_m$ can be positive or negative. Operation of estimator 105, in accordance with the invention, is described below in conjunction with the flow chart shown in FIG. 2. The estimated error $\epsilon'_m$ is supplied to integrator 106 which provides an integrated version of the error signal to interpolator 107, namely, $delay(n) = delay(n-1) + \epsilon'_m$. In turn, interpolator 107 adjusts the number of samples per symbol of the data signal being supplied as an output from remodulator 104. Such interpolator arrangements are known (see for example, U.S. Pat. No. 4,866,647 issued to Cecil W. Farrow on Sep. 12, 1989). The adjusted output from interpolator 107 is the remodulated modem signal adjusted to the actual transmitted modem symbol rate.

Figure 2:
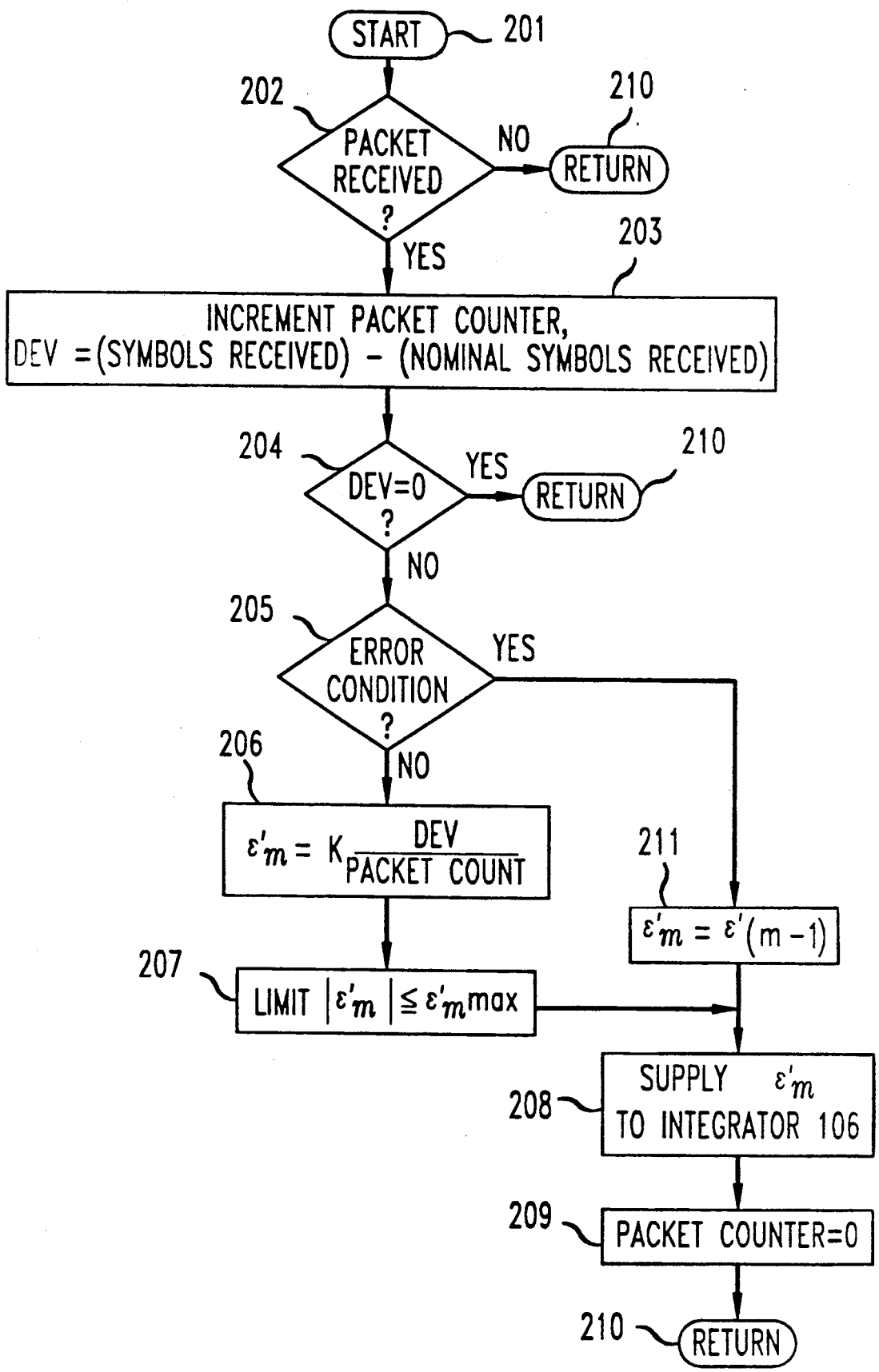
FIG. 2 illustrates in flowchart form the operation of estimator 105 of FIG. 1.

FIG. 2 shows, in flow chart form, the operation of estimator 105 in accordance with the invention. As indicated above, estimator 105 generates an estimate of the error between the actual modem transmitted symbol rate and a nominal symbol rate. Accordingly, the process is entered via START STEP 201, a predetermined number of times per data block (packet) interval. Before entering the process parameters are initialized to prescribed conditions. In this example, START is executed 16 times per packet interval. Thereafter, conditional branch point 202 tests to determine if a packet has been received. If the test result is NO, control is returned to a main routine (not described here) via step 210. If the test result in step 202 is YES, operational block 203 increments a packet counter by one (1) and calculates the deviation (DEV) between the number of symbols received and the nominal expected number of symbols to be received per packet. In this example, the number of symbols received is first obtained by dividing the number of bits in the received packet by a known factor specified in the V.0.29 format. Then, conditional branch point 204 tests to determine if the deviation (DEV) equals zero (0). If the test result is YES, the symbol rate of the data in the received packet is nominal and control is returned to the main routine via step 210. If the test result in step 204 is NO, there is a deviation from nominal and conditional branch point 205 tests to determine if there is an error condition. Error conditions may include, for example, dropped packets and start-up anomolies. If the test result in step 205 is NO, operational block 206 computes the symbol rate error $\epsilon'_m$, namely, $$\epsilon'_m = K \frac{DEV}{PACKET\ COUNT}.$$

Constant K is used to transform the function $$\frac{DEV}{PACKET\ COUNT}$$

into a form useable by integrator 106 and interpolator 107. It should be noted that the division in the above equation is carried out to a relatively high degree of precision, in this example, 32 bits. Thereafter, operational block 207 causes the magnitude of the error to be limited to a predetermined maximum value, namely, $|\epsilon'_m| \leq \epsilon'_m max$. Operational block 208 causes the estimated error $\epsilon'_m$ to be supplied to integrator 106. Thereafter, operational block 209 causes the packet counter to be reset to zero (0) and step 210 returns control to the main routine. Returning to step 205, if an error condition has been detected and the test result is YES, operational block 211 causes the prior error estimate to be employed, namely, $\epsilon_m = \epsilon'_{(m-1)}$, which is supplied via step 208 to integrator 106.

I claim:

1. Apparatus in a receiver for recovering an actual symbol rate of a digital modem modulated signal which has been demodulated to obtain a baseband digital signal for digital transmission, comprising:

means for remodulating a received baseband digital signal to obtain a modem modulated signal having a known nominal symbol rate;

means responsive to said received baseband digital signal for generating an estimate of error between said known nominal symbol rate and the actual symbol rate of the modem modulated signal which had been demodulated for transmission as the baseband digital signal; and means supplied with said error estimate for adjusting said nominal symbol rate of the remodulated modem signal to obtain a modem signal having the actual symbol rate of the modem modulated signal which had been demodulated for transmission as the baseband digital signal.

2. The apparatus as defined in claim 1 wherein said received baseband digital signal includes blocks of data, each normally having a known nominal number of data bits, and wherein said means for estimating includes means for measuring an interval between blocks of data in the received baseband digital signal having other than said nominal number of data bits.

3. The apparatus as defined in claim 2 wherein each of said blocks of data is of a predetermined fixed interval.

4. The apparatus as defined in claim 3 wherein said measured interval is proportional to said error estimate.

5. The apparatus as defined in claim 4 wherein each of said blocks of data comprises an information carrying portion of a packet.

6. The apparatus as defined in claim 4 wherein said means for adjusting includes means for obtaining an integrated version of said error signal and interpolator means responsive to said integrated version of said error signal for adjusting the symbol rate of said remodulated modem signal to obtain the original transmitted symbol rate.

7. In a receiver, a method for recovering the actual symbol rate of a digital modem modulated signal which has been demodulated to obtain a baseband digital signal for digital transmission comprising the steps of:

remodulating a received baseband digital signal to obtain a modem modulated signal at a known nominal symbol rate;

generating in response to said received baseband digital signal an estimate of error between said nominal symbol rate and an actual symbol rate of the modem modulated signal which had been demodulated for transmission as the baseband digital signal; and adjusting in response to said error estimate said nominal symbol rate of a remodulated modem signal to obtain a modem signal having the actual symbol rate of the modem modulated signal which had been demodulated for transmission as the baseband digital signal.

8. The method as defined in claim 7 wherein said received baseband digital signal normally includes blocks of data having a known nominal number of data bits and wherein said step of generating the error estimate includes the step of measuring an interval between blocks of data in the received baseband digital signal having other than said nominal number of data bits.

9. The method as defined in claim 8 wherein each of said blocks of data is of a predetermined fixed interval.

10. The method as defined in claim 9 wherein said measured interval is proportional to said error estimate.

11. The method as defined in claim 10 wherein each of said blocks of data comprises an information carrying portion of a packet.

12. The method as defined in claim 10 wherein said step of adjusting includes the steps of obtaining an integrated version of said error signal and interpolating in response to said integrated version of said error signal for adjusting the symbol rate of said remodulated modem signal to obtain the original transmitted symbol rate.

13. Apparatus in a receiver for recovering an actual transmitted symbol rate of a digital modem modulated signal which has been demodulated to obtain a baseband digital signal for digital transmission, comprising:

means for remodulating a received baseband digital signal to obtain a modem modulated signal having a known nominal symbol rate, said received baseband digital signal including blocks of data, each block of data normally having a known nominal number of data bits and having a predetermined fixed interval;

means responsive to said received baseband digital signal for generating an estimate of error between said known nominal symbol rate and the actual symbol rate of the digital modem modulated signal which had been demodulated for transmission, said means for generating an estimate including means for measuring an interval between the blocks of data in the received digital baseband signal having other than said nominal number of data bits, said measured interval being proportional to said estimate of error; and means supplied with said error estimate for adjusting said nominal symbol rate of the remodulated modem modulated signal to obtain a modem modulated signal having the actual symbol rate of the modem modulated signal that had been demodulated for digital transmission, said means for adjusting including means for obtaining an integrated version of said error signal and interpolator means responsive to said integrated version of said error signal for adjusting said remodulated modem signal to obtain the actual symbol rate of the modem modulated signal that was demodulated for transmission as said baseband digital signal.

14. In a receiver, a method for recovering an actual transmitted symbol rate of a digital modem modulated signal which has been demodulated to obtain a baseband digital signal for digital transmission, comprising the steps of:

remodulating a received baseband digital signal to obtain a modem modulated signal having a known nominal symbol rate, said received baseband digital signal including blocks of data, each block of data normally having a known nominal number of data bits and having a predetermined fixed interval;

generating in response to said received baseband digital signal an estimate of error between said known nominal symbol rate and the actual symbol rate of the digital modem modulated signal which had been demodulated for transmission, said step of generating an estimate including a step of measuring an interval between the blocks of data in the received digital baseband signal having other than said nominal number of data bits, said measured interval being proportional to said estimate of error; and adjusting in response to said error estimate said nominal symbol rate of the remodulated modem modulated signal to obtain a modem modulated signal having the actual symbol rate of the modem modulated signal that had been demodulated for digital transmission, said step of adjusting including a step of obtaining an integrated version of said error signal and a step of interpolating in responsive to said integrated version of said error signal for adjusting said remodulated modem signal to obtain the actual symbol rate of the modem modulated signal that was demodulated for transmission as said baseband digital signal.

* * * * *